US011359996B2

United States Patent
Svensson et al.

(10) Patent No.: US 11,359,996 B2
(45) Date of Patent: Jun. 14, 2022

(54) SOOT MEASUREMENT SYSTEM

(71) Applicant: Caterpillar Inc., Peoria, IL (US)

(72) Inventors: Kenth I. Svensson, Peoria, IL (US); Ronald G Silver, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 285 days.

(21) Appl. No.: 16/683,991

(22) Filed: Nov. 14, 2019

(65) Prior Publication Data

US 2021/0148789 A1  May 20, 2021

(51) Int. Cl.
*G01M 15/10* (2006.01)
*F01N 3/035* (2006.01)

(52) U.S. Cl.
CPC .......... *G01M 15/102* (2013.01); *F01N 3/035* (2013.01)

(58) Field of Classification Search
CPC ... G01M 15/102; G01M 15/108; F01N 3/035; F01N 11/00; F01N 9/00; F01N 2370/00; F01N 2470/04; F01N 2510/06; F01N 2560/05; F01N 2560/12; F01N 2900/0416; F01N 2900/1402; F01N 2900/1404; F01N 2900/16; F01N 13/008; Y02T 10/40
See application file for complete search history.

(56) References Cited

U.S. PATENT DOCUMENTS

| | | | | |
|---|---|---|---|---|
| 6,723,990 B2 * | 4/2004 | DiDomenico | ...... | G01M 15/108 250/339.01 |
| 6,900,893 B2 * | 5/2005 | Foley | .................. | G01M 15/108 250/339.01 |
| 7,420,662 B2 * | 9/2008 | Yalin | ..................... | F02D 35/022 356/317 |
| 8,148,290 B2 | 4/2012 | Mueller et al. | | |
| 8,218,147 B2 * | 7/2012 | Janssen | .................. | G01N 21/85 356/438 |
| 8,223,337 B2 * | 7/2012 | Janssen | ............... | G01M 15/108 356/438 |
| 8,451,444 B2 * | 5/2013 | Parks | .................. | G01N 21/474 356/338 |
| 8,842,283 B2 * | 9/2014 | Janssen | .................. | G01N 21/85 356/438 |

(Continued)

FOREIGN PATENT DOCUMENTS

DE  4241098 A1  6/1993
EP  2078832 B1  11/2010

(Continued)

*Primary Examiner* — Freddie Kirkland, III
(74) *Attorney, Agent, or Firm* — Harrity & Harrity LLP

(57) ABSTRACT

A device that includes a conduit, a first window, a second window, a first catalyzed layer, a second catalyzed layer, an optical source, and an optical detector is disclosed. The conduit may be configured to receive an exhaust gas. The first catalyzed layer may be disposed on the first window and the second catalyzed layer may be disposed on the second window. The first catalyzed layer and the second catalyzed layer may be configured to cause a reaction with soot in the exhaust gas at an activation temperature to reduce accumulation of the soot on the first window and the second window. The optical source may be configured to emit a beam of light into the conduit through the first window. The optical detector may be configured to receive at least a portion of the beam of light through the second window.

19 Claims, 4 Drawing Sheets

(56) References Cited

U.S. PATENT DOCUMENTS

| | | | |
|---|---|---|---|
| 9,194,273 B2* | 11/2015 | Janssen | F01N 11/00 |
| 9,696,249 B2 | 7/2017 | Hedayat et al. | |
| 2003/0058451 A1* | 3/2003 | Foley | G01M 15/108 |
| | | | 356/437 |
| 2011/0310391 A1* | 12/2011 | Janssen | G01N 21/85 |
| | | | 356/438 |

FOREIGN PATENT DOCUMENTS

| | | |
|---|---|---|
| JP | 4566070 B2 | 8/2010 |
| JP | 2013038196 A | 2/2013 |

* cited by examiner

SOOT MEASUREMENT SYSTEM

TECHNICAL FIELD

The present disclosure relates generally to exhaust aftertreatment systems and, for example, to a soot measurement system.

BACKGROUND

An engine (e.g., a diesel engine, a gasoline engine, a gaseous fuel-powered engine, a gas turbine engine, and/or another combustion engine) may combust a mixture of fuel and an intake charge (e.g., air that may include diluents such as re-circulated exhaust gases, gaseous fuels such as natural gas, and/or the like) to generate power for use with a machine (e.g., a vehicle, a work machine, a generator, and/or the like). During combustion, the engine may emit an exhaust gas including a complex combination of constituents. Although dependent on the mixture of fuel and an intake charge used, the exhaust gas may generally be composed of non-toxic gaseous compounds, such as nitrogen ($N_2$), water vapor ($H_2O$), carbon dioxide ($CO_2$), and/or the like. Under some operating conditions, the exhaust gas may additionally carry air pollutants, such as carbon monoxide (CO), nitrogen oxides ($NO_x$), soot (e.g., unburned hydrocarbons ($C_xH_y$) and/or other carbon-based particulates resulting from incomplete combustion), and/or the like. Engine manufacturers may use aftertreatment systems to trap some air pollutants and to reduce unwanted emissions. However, as environmental concerns continue to grow and as exhaust emission standards become more stringent, engine manufacturers continue to search for new ways to improve efficiency of combustion engines, improve effectiveness of aftertreatment systems, and/or otherwise further reduce air pollutants.

In some cases, an engine manufacturer may monitor an amount of soot or a soot level of an exhaust gas in order to identify causal relationships between variations in soot levels and different operating conditions of an engine. The engine manufacturer may use such causal relationships to identify a deficiency associated with a combustion phase, a deficiency associated with an aftertreatment phase, and/or the like. In some cases, the soot level can be measured based on a transmittance of an exhaust gas using a beam of light that is emitted into a window of an exhaust pipe to traverse a flow of the exhaust gas, and onto a photodiode positioned at an opposing window of the exhaust pipe. The transmittance (e.g., a percentage of the light that is allowed to pass through the exhaust gas) may be derived based on a ratio between a signal intensity of the light that was emitted and a signal intensity of the light that was received by the photodiode. Furthermore, a difference in the signal intensity (e.g., corresponding to an amount of the light that was absorbed by or lost to soot in the exhaust gas) may be used to derive the soot level. Over time, however, thermophoresis between the windows and the exhaust gas can cause soot to collect on the windows and adversely affect measurements. Current soot measurement solutions lack features to sufficiently address such drawbacks.

One attempt to provide a solution for evaluating a vehicle is disclosed in German Publication No. DE 42 41 098, by Stehr, published on Jun. 17, 1993 ("the '098 publication"). In particular, the '098 publication discloses a gas flow measuring device including a gas flow tube with windows for coupling a measurement beam into and out of the tube. The '098 publication further discloses arrangements for preventing build-up of deposits on an exhaust gas side of the window surfaces. The '098 publication discloses that the surfaces of the windows are coated with a layer of oxidizing catalytic material that is transparent to the measurement beam to reduce an ignition temperature of the deposits. However, the '098 publication does not sufficiently address the drawbacks of currently available soot measurement solutions or the needs discussed above. For example, the '098 publication does not disclose measuring soot levels of exhaust gas in the gas flow tube, detecting a condition when soot collects on the windows of the gas flow tube, and performing a routine that can actively remove an accumulation of soot from the windows.

A soot measurement system of the present disclosure solves one or more of the problems set forth above and/or other problems in the art.

SUMMARY

According to some implementations, a device may include a conduit, a first window, a second window, a first catalyzed layer, a second catalyzed layer, an optical source, and an optical detector. The conduit may be configured to receive an exhaust gas and have a first side and a second side. The first window may be disposed on the first side of the conduit, and the second window may be disposed on the second side of the conduit. The first catalyzed layer may be disposed on an inner surface of the first window, and the second catalyzed layer may be disposed on an inner surface of the second window. The first catalyzed layer and the second catalyzed layer may be configured to cause a reaction with soot in the exhaust gas at an activation temperature to reduce accumulation of the soot on the first window and the second window. The optical source may be disposed relative to the first window and configured to emit a beam of light into the conduit through the first window. The optical detector may be disposed relative to the second window and configured to receive at least a portion of the beam of light through the second window.

According to some implementations, a system may include a combustion engine, a conduit, a first window, a second window, a first catalyzed layer, a second catalyzed layer, an optical source, an optical detector, and a controller. The combustion engine may be configured to combust fuel and generate an exhaust gas. The conduit may be coupled to the combustion engine and configured to receive the exhaust gas. The first window may be disposed on a first side of the conduit, and the second window may be disposed on a second side of the conduit. The first catalyzed layer may be disposed on an inner surface of the first window, and the second catalyzed layer may be disposed on an inner surface of the second window. The first catalyzed layer and the second catalyzed layer may be configured to cause a reaction with soot in the exhaust gas at an activation temperature to reduce accumulation of the soot on the first window and the second window. The optical source may be disposed relative to the first window and configured to emit a beam of light into the conduit through the first window. The optical detector may be disposed relative to the second window and configured to receive at least a portion of the beam of light through the second window. The controller may be in communication with the combustion engine, the optical source, and the optical detector. The controller may be configured to determine a transmittance of the exhaust gas based on the beam of light emitted by the optical source and the portion of the beam of light received by the optical detector, and determine a soot index based on the transmittance.

According to some implementations, a method may include transmitting, to an optical source, a command signal to emit a beam of light having a first intensity through an exhaust gas carrying soot; receiving, from an optical detector, a detector signal corresponding to a second intensity of at least a portion of the beam of light emitted by the optical source and received by the optical detector; determining a transmittance of the exhaust gas based on the first intensity and the second intensity; determining a soot index based on the transmittance of the exhaust gas; and causing an action to be performed based on one or more of the transmittance or the soot index.

DETAILED DESCRIPTION

Figure 1:
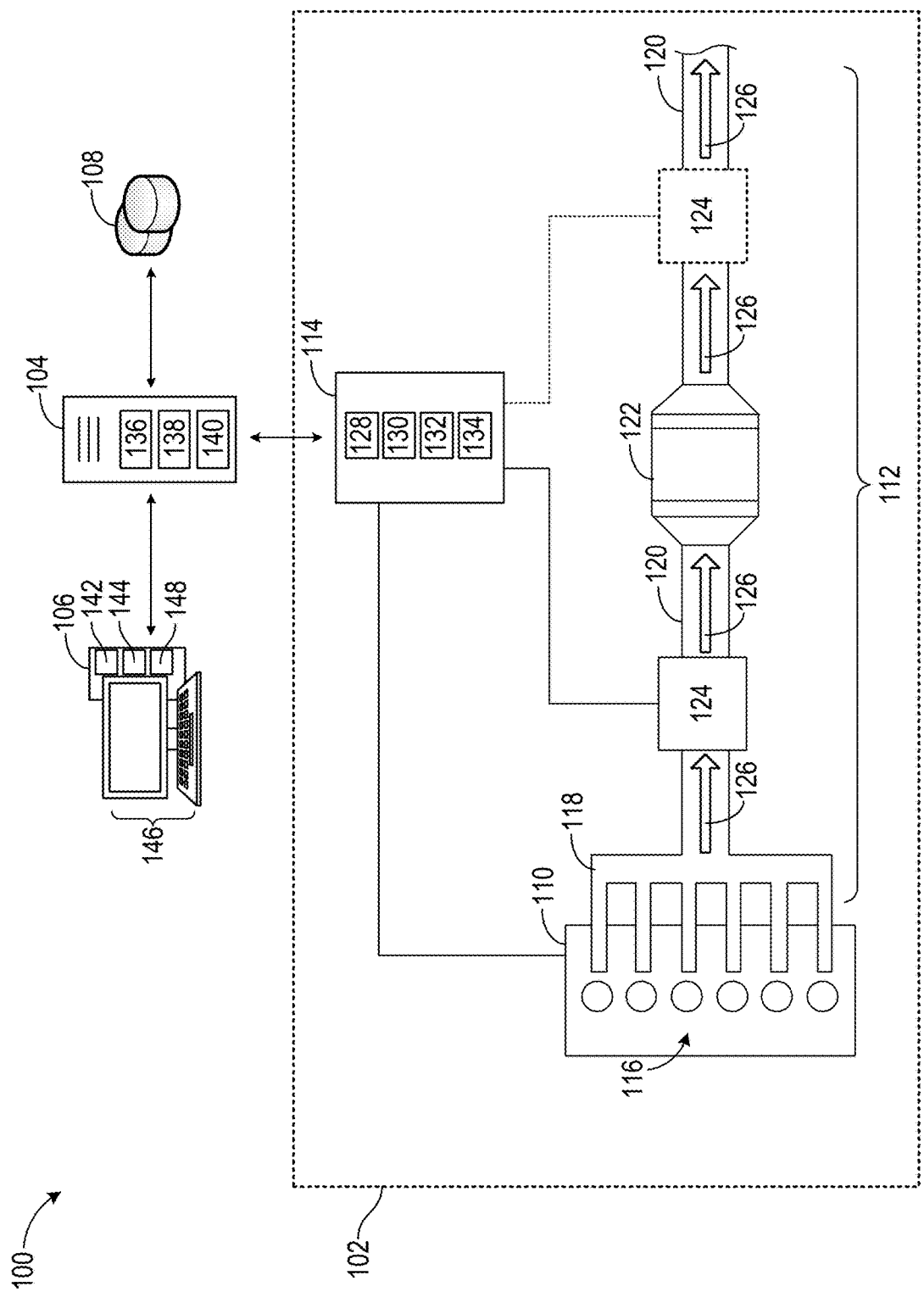
FIG. 1 is a diagram of an example soot measurement system described herein.

FIG. 1 is a diagram of an example soot measurement system 100 described herein. As shown in FIG. 1, soot measurement system 100 may be used in association with a machine 102 and include a management platform 104, a control station 106, a network storage device 108, and/or another device configured to aid soot measurement system 100 in measuring soot emitted by machine 102. Soot measurement system 100 may be used to monitor an amount of soot (e.g., unburned hydrocarbons and/or other carbon-based particulates) in an exhaust gas, or a soot level of an exhaust gas, emitted by machine 102, determine a relationship between the soot level and an operating condition of machine 102, adjust an operating parameter of machine 102 in a manner that reduces the soot level, and/or identify a deficiency associated with machine 102. Machine 102 may include a work machine (e.g., a truck, a dozer, a tractor, a wheel loader, a backhoe loader, an excavator, a cold planar, a paver, a compactor, and/or the like), a vehicle (e.g., an off-road vehicle, an on-road vehicle, a rail vehicle, a marine vehicle, and/or the like), a generator, a gas turbine machine and/or application, and/or another machine that generates power via combustion of a mixture of fuel and an intake charge (e.g., air that may include diluents such as re-circulated exhaust gases, gaseous fuels such as natural gas, and/or the like). Machine 102 may be operated by a local operator and/or by a remote operator via management platform 104 and/or control station 106. In some examples, machine 102 may be operated autonomously or semi-autonomously. Control station 106, network storage device 108, and/or another device of soot measurement system 100 may communicate with machine 102 directly and/or indirectly via management platform 104.

In some implementations, soot measurement system 100 may be used with multiple machines 102 and/or multiple control stations 106 that interact with management platform 104 and/or network storage device 108. In some examples, soot measurement system 100 may include multiple management platforms 104 and/or multiple network storage devices 108 that interact with machine 102 and/or control station 106. Soot measurement system 100 may be used with an autonomously or a semi-autonomously operated machine 102. For example, management platform 104 may be used to guide, navigate, and/or control an autonomous or a semi-autonomous machine 102 (e.g., a mobile work machine) based on location data of machine 102, coordinate data associated with a worksite associated with machine 102, coordinate data associated with a target work path and/or a target site plan, and/or the like. Machine 102 may receive guidance, navigation, and/or control information from an operator local to machine 102, from a remote operator via control station 106, and/or from another device of soot measurement system 100.

As further shown in FIG. 1, machine 102 includes an engine 110, an exhaust system 112, and a controller 114. Engine 110 includes one or more combustion chambers 116 configured to combust a mixture of fuel and an intake charge to generate power for machine 102. Exhaust system 112 includes an exhaust manifold 118, a conduit 120, an aftertreatment system 122, and a soot measurement device 124. Exhaust manifold 118 may be coupled to combustion chambers 116 and configured to receive an exhaust gas 126 resulting from combustion of the mixture of fuel and an intake charge. Conduit 120 may be coupled to an outlet of exhaust manifold 118 and configured to direct exhaust gas 126 to aftertreatment system 122. Aftertreatment system 122 may include a particulate filter (e.g., catalyzed or un-catalyzed filter) and/or another mechanism configured to at least partially trap and/or remove soot from exhaust gas 126 before releasing exhaust gas 126 into surrounding atmosphere. Soot measurement device 124 may be removably or permanently coupled in fluid communication with conduit 120 and configured to measure a soot level of exhaust gas 126, as discussed in more detail below. Soot measurement device 124 may be disposed in a section of conduit 120 that is upstream of aftertreatment system 122 and/or downstream of aftertreatment system 122.

Controller 114 includes a processor 128, a memory 130, a user interface 132, and a communication device 134. Processor 128 is implemented in hardware, firmware, and/or a combination of hardware and software capable of being programmed to perform a function associated with machine 102 and/or soot measurement system 100. Memory 130 includes a random-access memory (RAM), a read only memory (ROM), and/or another type of dynamic or static storage device that stores information and/or instructions to be performed by processor 128. User interface 132 includes an input device and an output device. The input device may enable an operator of machine 102 to specify an instruction, a command, and/or another operating parameter for operating machine 102 and/or soot measurement device 124. The output device may enable an operator of machine 102 to monitor an operating condition of machine 102, access a soot index corresponding to a soot level of exhaust gas 126, access a record and/or a notification relating to a soot index determined for machine 102, access a historic event associated with machine 102, and/or the like.

Communication device 134 includes a wireless local area network (WLAN) component (e.g., a Wi-Fi component), a radio frequency (RF) communication component (e.g., a Bluetooth component and/or a cellular component), a positioning component (e.g., a global positioning system (GPS) component and/or a global navigation satellite system (GNSS) component), and/or the like. Communication device 134 may enable communication between machine 102, management platform 104, control station 106, network storage device 108, and/or another device. Communication device 134 may enable processor 128 to receive information (e.g., relating to an operating parameter for operating machine 102 and/or soot measurement device 124) from management platform 104, control station 106, and/or network storage device 108. Communication device 134 may enable processor 128 to transmit information (e.g., relating to an operating condition of machine 102, a soot index determined by soot measurement device 124, a record and/or a notification relating to a soot index of machine 102, a historic event associated with machine 102, and/or the like) to management platform 104, control station 106, and/or network storage device 108. Controller 114 may communicate with control station 106 and/or network storage device 108 directly and/or indirectly via management platform 104.

In some implementations, controller 114 may be integrated with or include an engine control module (ECM), an engine control unit (ECU), a controller of an aftertreatment system, and/or another controller that is associated with machine 102. For example, controller 114 may be configured to control soot measurement device 124 in addition to engine 110, exhaust system 112, and/or another component of machine 102. Controller 114 may include a dedicated controller of soot measurement device 124 that is provided separately from and in addition to an ECM, an ECU, and/or another controller associated with machine 102. In some cases, controller 114 and/or soot measurement device 124 may be removably installed on machine 102 or permanently integrated with machine 102. In some cases, controller 114 and/or soot measurement device 124 may be provided separately from machine 102 (e.g., as test equipment configured to be temporarily attached to machine 102 for emissions testing within a test environment). One or more functions described herein as being performed by controller 114 may be performed by management platform 104, control station 106, and/or network storage device 108.

As further shown in FIG. 1, management platform 104 includes a processor 136, a memory 138, and a communication device 140. Processor 136 is implemented in hardware, firmware, and/or a combination of hardware and software capable of being programmed to perform a function associated with machine 102 and/or soot measurement system 100. Memory 138 includes a RAM, a ROM, and/or another type of dynamic or static storage device that stores information and/or instructions to be performed by processor 136. Communication device 140 includes a WLAN component (e.g., a Wi-Fi component), an RF communication component (e.g., a Bluetooth component), a positioning component (e.g., a GPS component and/or a GNSS component), and/or the like. For example, communication device 140 may enable processor 136 to exchange information (e.g., relating to an operating parameter for operating machine 102 and/or soot measurement device 124, an operating condition of machine 102, a soot index determined by soot measurement device 124, a record and/or a notification relating to a soot index of machine 102, a historic event associated with machine 102, and/or the like) with machine 102, control station 106, and/or network storage device 108.

As further shown in FIG. 1, control station 106 includes a processor 142, a memory 144, a user interface 146, and a communication device 148. Processor 142 is implemented in hardware, firmware, and/or a combination of hardware and software capable of being programmed to perform a function associated with machine 102 and/or soot measurement system 100. Memory 144 includes a RAM, a ROM, and/or another type of dynamic or static storage device that stores information and/or instructions to be performed by processor 142. User interface 146 includes an input device and an output device. The input device may enable an operator of machine 102 (e.g., an operator that is remote from machine 102 and/or soot measurement device 124) to specify an instruction, a command, and/or another operating parameter for operating machine 102 and/or soot measurement device 124. The output device may enable an operator of machine 102 to monitor an operating condition of machine 102, access a soot index corresponding to a soot level of exhaust gas 126, access a record and/or a notification relating to a soot index determined for machine 102, access a historic event associated with machine 102, and/or the like.

Communication device 148 includes a WLAN component (e.g., a Wi-Fi component), an RF communication component (e.g., a Bluetooth component), a positioning component (e.g., a GPS component and/or a GNSS component), and/or the like. Communication device 148 may enable processor 142 to receive information (e.g., relating to an operating condition of machine 102, a soot index determined by soot measurement device 124, a record and/or a notification relating to a soot index of machine 102, a historic event associated with machine 102, and/or the like) from machine 102, management platform 104, and/or network storage device 108. Communication device 148 may enable processor 142 to transmit information (e.g., relating to an operating parameter for operating machine 102 and/or soot measurement device 124) to machine 102, and/or transmit information (e.g., relating to an operating condition of machine 102, a soot index determined by soot measurement device 124, a record and/or a notification relating to a soot index of machine 102, a historic event associated with machine 102, and/or the like) to management platform 104 and/or network storage device 108. Control station 106 may communicate with machine 102 and/or network storage device 108 directly and/or indirectly via management platform 104. In some cases, control station 106 may serve as a user interface of management platform 104.

As indicated above, FIG. 1 is provided as an example. Other examples may differ from what was described in connection with FIG. 1.

Figure 2B:
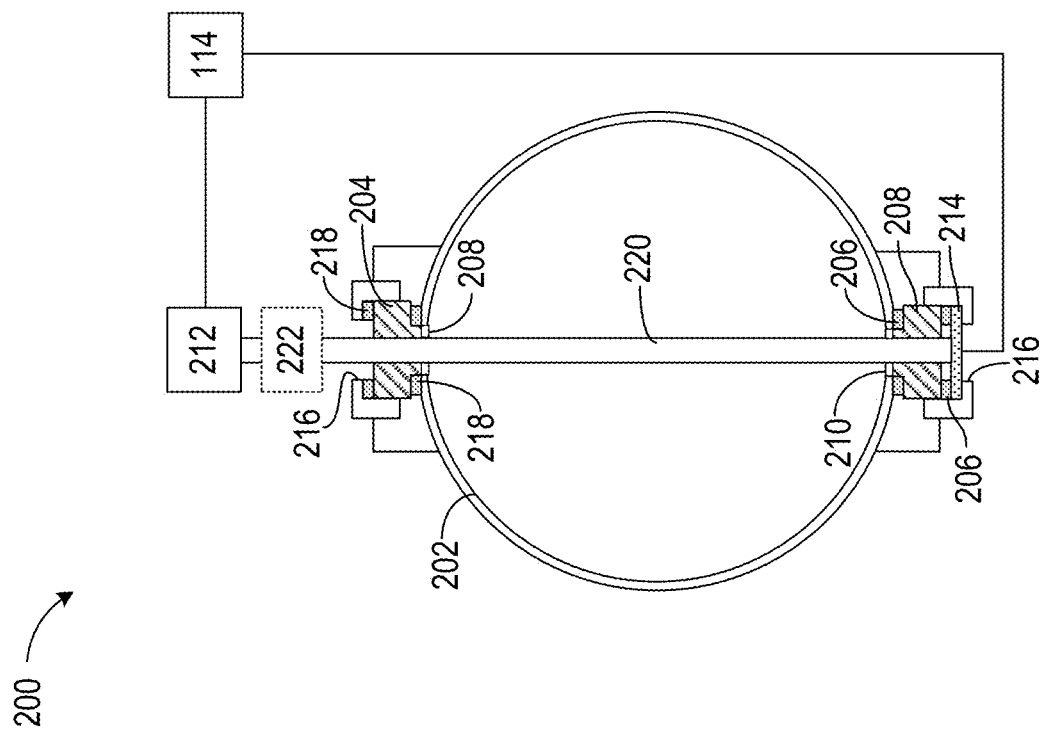
FIGS. 2A and 2B are diagrams of an example soot measurement device described herein.
Figure 2A:
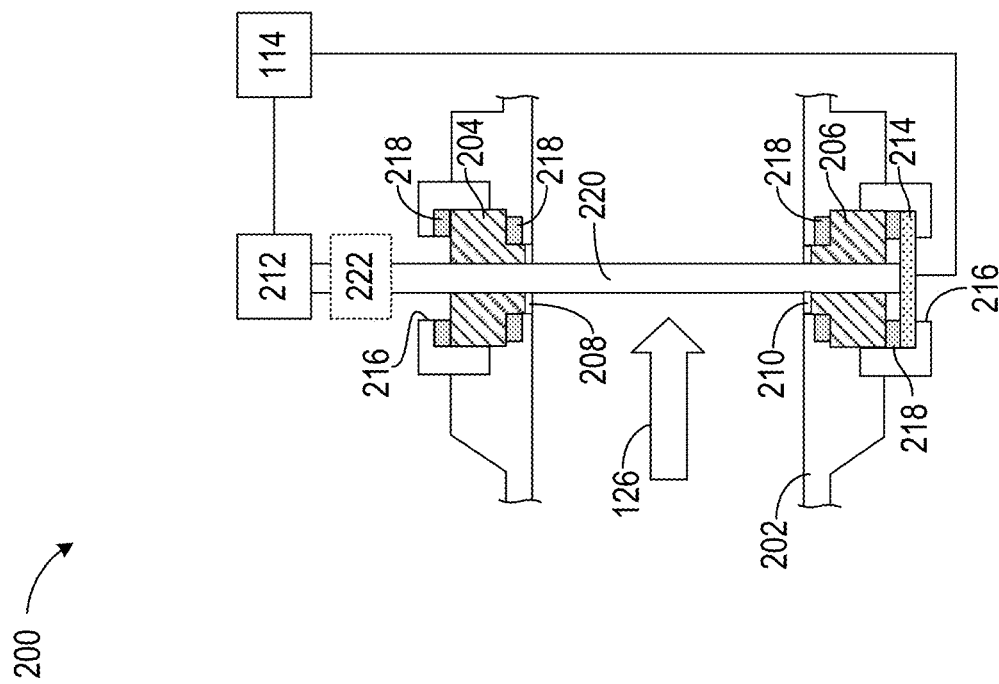

FIGS. 2A and 2B are diagrams of an example soot measurement device 200 (e.g., soot measurement device 124 in FIG. 1) described herein. As shown by the cross-sectional side view in FIG. 2A and the cross-sectional front view in FIG. 2B, soot measurement device 200 includes a conduit 202, a first window 204, a second window 206, a first catalyzed layer 208, a second catalyzed layer 210, an optical source 212, and an optical detector 214. Soot measurement device 200 may include controller 114 (e.g., provided as a dedicated controller of soot measurement device 200 or integrated with a controller of machine 102) that is in communication with optical source 212 and/or optical detector 214. Conduit 202 includes a structure that forms a passageway configured to receive exhaust gas 126 flowing through conduit 120 of machine 102. Conduit 202 may be in fluid communication with a section of conduit 120 that is upstream of aftertreatment system 122 or downstream of aftertreatment system 122. Conduit 202 may be integrated with or include a section of conduit 120 of machine 102, and/or conduit 202 may be provided separately from conduit 120 of machine 102 and configured to temporarily attach to conduit 120 (e.g., for emissions testing and/or the like).

First window 204 and second window 206 include a transparent material configured to allow transmission of light with minimal loss in intensity. For example, first window 204 and second window 206 may include silicon dioxide (e.g., silica), quartz, sapphire, and/or another suitable material. First window 204 may be disposed within an aperture 216 that is located on a side of conduit 202, and second window 206 may be disposed within another aperture 216 that is located on another side of conduit 202. For example, first window 204 and second window 206 may be arranged to be opposed to one another relative to conduit 202 and aligned with optical source 212 and optical detector 214. First window 204 and second window 206 may be secured within apertures 216 of conduit 202 via one or more seals 218. Soot measurement device 200 may include a different number and/or a different arrangement of windows. For example, soot measurement device 200 may include a single window (e.g., circumferentially extending about conduit 202).

First catalyzed layer 208 and second catalyzed layer 210 include a transparent compound configured to cause a reaction with soot in exhaust gas 126 and reduce obstruction of first window 204 and second window 206. For example, first catalyzed layer 208 and second catalyzed layer 210 may include a compound formed of a rare metal (e.g., cerium oxide and/or the like) and/or a catalyst that is configured to cause a reaction with soot (e.g., cause oxygen, nitrogen dioxide, and/or any other compound to react with soot and convert soot to carbon dioxide) at an activation temperature (e.g., a temperature of at least 400° C. and/or another temperature typical of exhaust gas 126) to oxidize soot that may have collected on first catalyzed layer 208 and/or second catalyzed layer 210. In some examples, first catalyzed layer 208 and second catalyzed layer 210 may be formed of a different metal and/or catalyst, and configured to cause a reaction with soot at a different activation temperature. First catalyzed layer 208 may be disposed on an inner surface of first window 204, and second catalyzed layer 210 may be disposed on an inner surface of second window 206. First catalyzed layer 208 and second catalyzed layer 210 may be in fluid communication with exhaust gas 126 and configured to conform to an inner surface of conduit 202 so as not to disrupt flow of exhaust gas 126.

In some implementations, first catalyzed layer 208 and second catalyzed layer 210 may have thicknesses suited to sufficiently cause a reaction with soot in exhaust gas 126 without adversely affecting transmittance. For example, first catalyzed layer 208 and second catalyzed layer 210 may be formed with compounds and dimensions that exhibit at least 90% transmittance using visible light. If first catalyzed layer 208 and second catalyzed layer 210 are formed of a compound using cerium oxide, first catalyzed layer 208 and second catalyzed layer 210 may have thicknesses ranging between approximately 1 nm and 2.5 nm. If first catalyzed layer 208 and second catalyzed layer 210 are formed of a compound with greater transmittance properties, first catalyzed layer 208 and second catalyzed layer 210 may have thicknesses ranging between approximately 1 nm and 10 nm. First catalyzed layer 208 and second catalyzed layer 210 may be coated onto inner surfaces of first window 204 and second window 206. Additionally, or alternatively, first catalyzed layer 208 and second catalyzed layer 210 may be provided as a film that can be removably coupled to first window 204 and second window 206.

Optical source 212 includes a device configured to emit a beam of light 220 (e.g., visible light and/or another form of radiation) through exhaust gas 126 flowing through conduit 202. Optical source 212 may be configured to emit beam of light 220 with a particular wavelength. In one example, optical source 212 may be configured to emit laser light having a wavelength between approximately 400 nm and 700 nm. In other examples, optical source 212 may be configured to emit laser light having a different wavelength (e.g., less than approximately 400 nm corresponding to an ultraviolet light, greater than approximately 700 nm corresponding to an infrared light, and/or the like). In some examples, optical source 212 may be configured to emit a beam of light having a range of wavelengths using a broadband source (e.g., a light bulb, a light-emitting diode (LED), and/or the like) that may or may not be filtered to reduce the range of wavelengths. Optical source 212 may be disposed relative to first window 204 and configured to align beam of light 220 with first window 204, first catalyzed layer 208, second window 206, second catalyzed layer 210, and optical detector 214. Optical source 212 may be arranged to emit beam of light 220 through conduit 202 in a direction that sufficiently traverses a flow of exhaust gas 126. As shown for the example in FIGS. 2A and 2B, beam of light 220 may be emitted in a direction that is substantially perpendicular to a flow of exhaust gas 126. In some examples, optical source 212 may be provided with a lens pack 222 configured to focus, expand, or otherwise adjust beam of light 220. In some examples, first window 204 and/or second window 206 may be provided with a convex surface and/or a concave surface configured to focus, expand, or otherwise adjust beam of light 220. Optical source 212 may be integrated with conduit 202 and/or mounted onto an outer surface of conduit 202. In some examples, optical source 212 may be provided separately from and removably positioned relative to conduit 202.

Optical detector 214 includes a photodiode and/or another device configured to detect at least a portion of beam of light 220 emitted by optical source 212. Optical detector 214 may be configured to detect beam of light 220 having a particular wavelength. In one example, optical detector 214 may be configured to detect a laser having a wavelength between approximately 400 nm and 700 nm. In other examples, optical detector 214 may be configured to detect a laser having a different wavelength (e.g., less than approximately 400 nm corresponding to an ultraviolet light, greater than approximately 700 nm corresponding to an infrared light, and/or the like). In some examples, optical detector 214 may be configured to detect a beam of light having a range of wavelengths provided via a broadband source (e.g., a light bulb, an LED, and/or the like) that may or may not be filtered to reduce the range of wavelengths. Optical detector 214 may be disposed relative to second window 206 and aligned with first window 204, first catalyzed layer 208, second window 206, and optical source 212 in a manner configured to receive at least a portion of beam of light 220. For example, optical detector 214 may be coupled to second window 206 and secured within aperture 216 via one or more seals 218. Optical detector 214 may be oriented relative to conduit 202 in a manner that enables optical detector 214 to sufficiently receive a portion of beam of light 220 traversing a flow of exhaust gas 126. As shown, optical detector 214 may be positioned to receive beam of light 220 that is emitted by optical source 212 in a direction that is substantially perpendicular to a flow of exhaust gas 126. Optical detector 214 may be configured to convert a received portion of beam of light 220 into an electrical signal corresponding to an intensity of the received portion of beam of light 220.

In some implementations, soot measurement device 200 may use controller 114 to control optical source 212 and/or optical detector 214. For example, controller 114 may transmit a command signal to optical source 212 to emit beam of light 220 with a first intensity, and receive a detector signal from optical detector 214 corresponding to a second intensity of at least a portion of beam of light 220 received by optical detector 214. Controller 114 may determine a transmittance of exhaust gas 126 based on the first intensity and the second intensity. The transmittance may be determined as a percentage, a value, a ratio, a fraction, and/or another index that quantifies an amount of beam of light 220 that is allowed to pass through exhaust gas 126 at a particular time. For example, if exhaust gas 126 does not include soot (e.g., unburned hydrocarbons and/or other carbon-based particulates that may absorb or scatter beam of light 220), the second intensity may approximate the first intensity and the transmittance may be approximately 100%. If exhaust gas 126 carries soot, the second intensity may be determined to be less than the first intensity and the transmittance may be less than 100%. Correspondingly, the transmittance and/or a difference between the first intensity and the second intensity may be used to derive an amount of beam of light 220 that is absorbed or scattered by soot in exhaust gas 126 at a particular time.

In some implementations, controller 114 may determine a soot index (e.g., an index corresponding to a soot level of exhaust gas 126 at a particular time) based on the transmittance of exhaust gas 126. Controller 114 may determine the soot index based on the transmittance and information relating to beam of light 220, exhaust gas 126, soot carried by exhaust gas 126, conduit 120, and/or the like. For example, controller 114 may derive the soot index based on a refractive index of the soot, a path length of beam of light 220 (e.g., a diameter of conduit 202), and/or the like. The soot index may be indicative of or expressed as a soot volume fraction and/or in terms of another index. Additionally, or alternatively, controller 114 may determine the soot index using a lookup table, a map, an equation, and/or another reference (e.g., stored in memory 130 of controller 114, memory 138 of management platform 104, memory 144 of control station 106, network storage device 108, and/or another data structure accessible to controller 114) that relates different transmittance values to different soot indices. Controller 114 may determine the transmittance and/or the soot index intermittently, periodically, and/or continuously in real-time during operation of machine 102.

In some implementations, controller 114 may cause an action to be performed based on the transmittance and/or the soot index. For example, controller 114 may generate a record and/or a notification of the transmittance and/or the soot index, transmit the record and/or the notification to management platform 104, control station 106, and/or network storage device 108, and/or store the record and/or the notification in a data structure accessible to an operator (e.g., via memory 130 of machine 102, memory 138 of management platform 104, memory 144 of control station 106, and/or network storage device 108). The record and/or the notification may include information relating to the transmittance, the soot index, a time corresponding to the transmittance and/or the soot index, and/or an operating condition of machine 102 at the time the transmittance and/or the soot index was determined (e.g., a throttle position, an engine speed, an engine cycle, an oil temperature, a coolant temperature, an intake air temperature, an oil pressure, an in-cylinder combustion pressure, an injection timing, a load, a mass flow rate of a variable geometry turbocharger, and/or another operating condition of machine 102 that is accessible to controller 114).

In some implementations, controller 114 may compare the transmittance with a transmittance threshold, generate a transmittance event if the transmittance does not satisfy the transmittance threshold, and generate a record and/or a notification of the transmittance event. For example, the transmittance threshold may correspond to a lower limit below which controller 114 may be unable to reliably and/or accurately determine the soot index. In such cases, the transmittance event may be indicative of an anomaly (e.g., soot has accumulated on first window 204 and/or second window 206 due to low exhaust gas temperatures and prolonged idling, engine 110 is emitting an excessive amount of soot, and/or another suboptimal condition exhibiting an abnormally low transmittance). In some examples, controller 114 may compare the soot index with a soot index threshold, generate a soot index event if the soot index satisfies the soot index threshold, and generate a record and/or a notification of the soot index event. For example, the soot index threshold may correspond to an upper limit, and the soot index event may correspond to an anomaly (e.g., soot has accumulated on first window 204 and/or second window 206, engine 110 is emitting an excessive amount of soot, and/or another suboptimal condition exhibiting an abnormally high soot index).

In some implementations, controller 114 may compare the transmittance with a transmittance threshold, and initiate a corrective action if the transmittance does not satisfy the transmittance threshold. The corrective action may increase an exhaust gas temperature of exhaust gas 126 to the activation temperature (e.g., a temperature of at least 400° C. and/or otherwise sufficient to allow first catalyzed layer 208 and second catalyzed layer 210 to oxidize soot that may be obstructing beam of light 220) for a threshold duration of time (e.g., a duration sufficient to clear soot that may have accumulated on first window 204 and/or second window 206). For example, controller 114 may transmit an engine control signal to engine 110 that temporarily increases an operating temperature of engine 110 (e.g., via adjusting an injection timing and/or a load, via adjusting a mass flow rate of a variable geometry turbocharger, and/or the like) in order to increase the exhaust gas temperature to the activation temperature. Controller 114 may maintain the corrective action for the threshold duration of time and/or until the transmittance satisfies the transmittance threshold. Controller 114 may repeat the corrective action if the transmittance does not satisfy the transmittance threshold upon expiration of the threshold duration of time.

In some implementations, controller 114 may compare the exhaust gas temperature with a temperature threshold, and initiate a corrective action if the exhaust gas temperature does not satisfy the temperature threshold. Controller 114 may receive the exhaust gas temperature via a temperature sensor that may be available in exhaust system 112 (e.g., coupled to exhaust manifold 118, conduit 120, and/or aftertreatment system 122 and in fluid communication with exhaust gas 126). In some examples, controller 114 may derive the exhaust gas temperature based on information from another sensor that may be available in machine 102 and/or another operating condition of machine 102 that is accessible to controller 114. The temperature threshold may correspond to a lower limit of a range of temperatures associated with the activation temperature (e.g., a temperature below which first catalyzed layer 208 and second catalyzed layer 210 may not effectively oxidize soot). The corrective action may increase the exhaust gas temperature to the threshold temperature (e.g., the activation temperature) for a threshold duration of time. Controller 114 may maintain the corrective action for the threshold duration of time and/or until the exhaust gas temperature satisfies the temperature threshold. Controller 114 may repeat the corrective action if the exhaust gas temperature does not satisfy the temperature threshold upon expiration of the threshold duration of time.

As indicated above, FIGS. 2A and 2B are provided as an example. Other examples may differ from what was described in connection with FIGS. 2A and 2B.

Figure 3A:
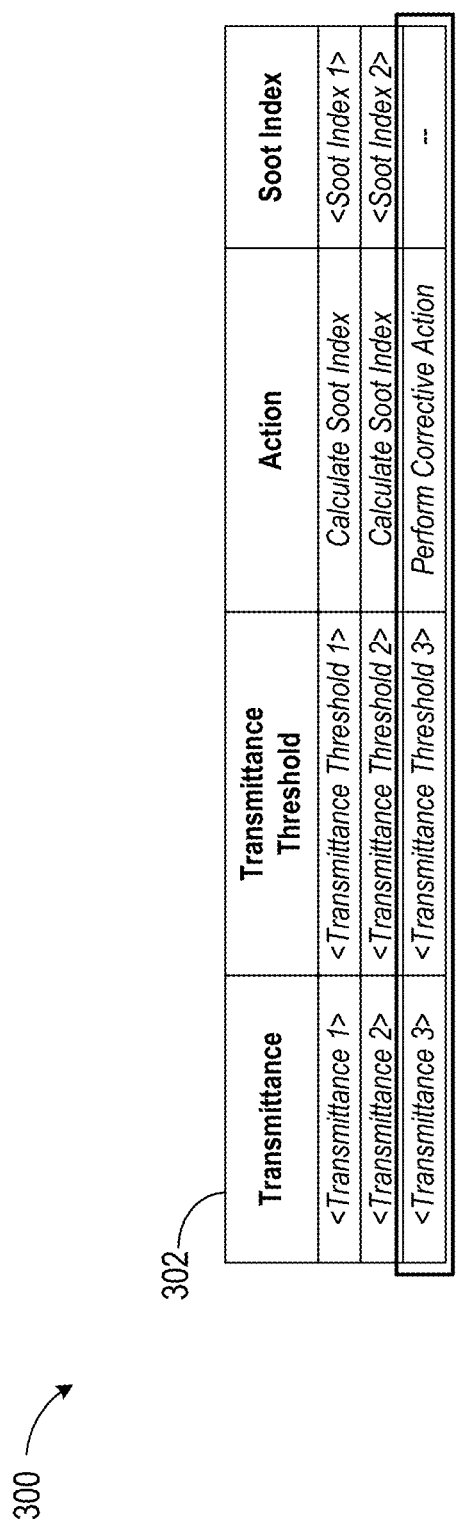
FIGS. 3A and 3B are diagrams of an example implementation of a soot measurement system described herein.
Figure 3B:
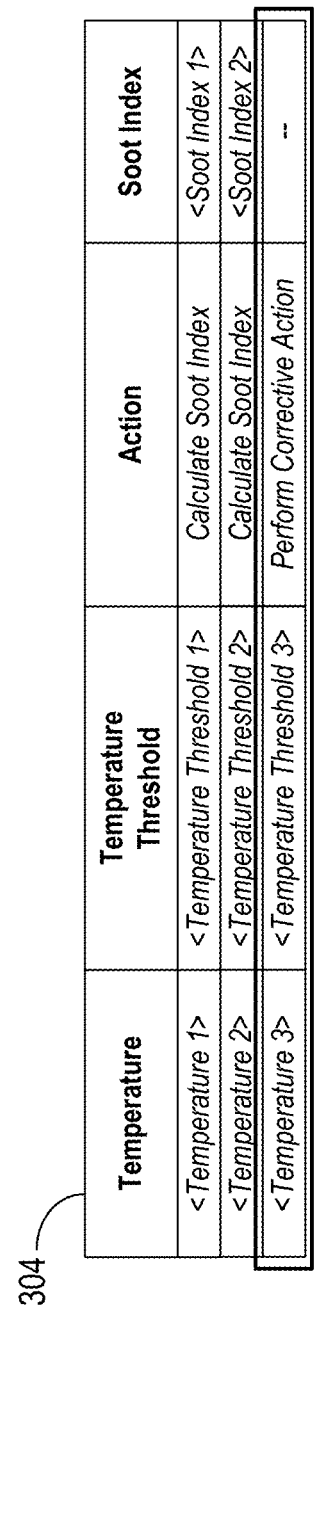

FIGS. 3A and 3B are diagrams of an example implementation 300 of soot measurement system 100 described herein. As shown in FIG. 3A, and by reference number 302, controller 114 may determine a transmittance (e.g., Transmittance N) of exhaust gas 126 at a particular instance during operation of machine 102. Controller 114 may compare the transmittance with a transmittance threshold (e.g., Transmittance Threshold N) to ensure machine 102 is clear of significant anomalies that may adversely affect a determination by soot measurement system 100. For example, the transmittance threshold may correspond to a lower limit of a range of acceptable transmittance values. Transmittance values falling below the transmittance threshold may be indicative of an anomaly (e.g., soot has accumulated on first window 204 and/or second window 206 due to low exhaust gas temperatures and prolonged idling, engine 110 is emitting an excessive amount of soot, and/or another suboptimal condition exhibiting an abnormally low transmittance). In some examples, the transmittance threshold may be dynamically adjusted (e.g., based on a change in an operating condition of machine 102, a change in an ambient temperature, a change in an atmospheric pressure, and/or the like).

As further shown in FIG. 3A, if the transmittance (e.g., Transmittance 1 or Transmittance 2) satisfies the transmittance threshold (e.g., Transmittance Threshold 1 or Transmittance Threshold 2), controller 114 may proceed to calculate the corresponding soot index (e.g., Soot Index 1 or Soot Index 2). If the transmittance (e.g., Transmittance 3) does not satisfy the transmittance threshold (e.g., Transmittance Threshold 3), controller 114 may perform a corrective action, as discussed above. For example, controller 114 may transmit an engine control signal to engine 110 that temporarily increases an operating temperature of engine 110 (e.g., via adjusting an injection timing and/or a load, via adjusting a mass flow rate of a variable geometry turbocharger, and/or the like) in order to increase the exhaust gas temperature to the activation temperature (e.g., a temperature of at least 400° C. and/or otherwise sufficient to allow first catalyzed layer 208 and second catalyzed layer 210 to oxidize soot). Controller 114 may maintain and/or repeat the corrective action until the transmittance satisfies the transmittance threshold (e.g., until first catalyzed layer 208 and second catalyzed layer 210 sufficiently clear an accumulation of soot that may be obstructing first window 204 and/or second window 206). Once the transmittance satisfied the transmittance threshold, controller 114 may proceed to calculate the soot index.

As shown in FIG. 3B, and by reference number 304, controller 114 may determine an exhaust gas temperature (e.g., Temperature N) at a particular instance during operation of machine 102. Controller 114 may compare the exhaust gas temperature with a temperature threshold (e.g., Temperature Threshold N) to ensure machine 102 is clear of significant anomalies that can adversely affect a determination of soot measurement system 100. For example, the temperature threshold may correspond to a lower limit of a range of activation temperatures (e.g., temperatures sufficient to allow first catalyzed layer 208 and second catalyzed layer 210 to cause a reaction with soot in exhaust gas 126). Exhaust gas temperatures falling below the temperature threshold may be indicative of a condition not suitable for reliably measuring soot levels (e.g., engine 110 is in a prolonged idling state, machine 102 is operating in suboptimal ambient temperatures, machine 102 is operating in suboptimal atmospheric pressures, and/or another suboptimal condition exhibiting low exhaust gas temperatures). In some examples, the temperature threshold may be dynamically adjusted (e.g., based on a change in an operating condition of machine 102, a change in an ambient temperature, a change in an atmospheric pressure, and/or the like).

As further shown in FIG. 3B, if the temperature (e.g., Temperature 1 or Temperature 2) satisfies the temperature threshold (e.g., Temperature Threshold 1 or Temperature Threshold 2), controller 114 may proceed to calculate the corresponding soot index (e.g., Soot Index 1 or Soot Index 2). If the temperature (e.g., Temperature 3) does not satisfy the temperature threshold (e.g., Temperature Threshold 3), controller 114 may perform a corrective action, as discussed above. For example, controller 114 may transmit an engine control signal to engine 110 that temporarily increases an operating temperature of engine 110 (e.g., via adjusting an injection timing and/or a load, via adjusting a mass flow rate of a variable geometry turbocharger, and/or the like) in order to increase the exhaust gas temperature to the activation temperature (e.g., a temperature of at least 400° C. and/or otherwise sufficient to allow first catalyzed layer 208 and second catalyzed layer 210 to oxidize soot). Controller 114 may maintain and/or repeat the corrective action until the exhaust gas temperature satisfies the temperature threshold, and proceed to calculate the soot index once the exhaust gas temperature satisfies the temperature threshold. In some cases, controller 114 may further ensure that the transmittance satisfies the transmittance threshold prior to calculating the soot index.

In some implementations, controller 114 may generate a record and/or a notification based on the transmittance and/or the soot index. The record and/or notification may include information relating to the transmittance, the soot index, a time the transmittance and/or the soot index was determined, an associated operating condition of machine 102 (e.g., a throttle position, an engine speed, an engine cycle, an exhaust gas temperature, an oil temperature, a coolant temperature, an intake air temperature, an oil pressure, an in-cylinder combustion pressure, an injection timing, a load, a mass flow rate of a variable geometry turbocharger, and/or the like), and/or other information that enables an operator to correlate a variation in transmittance and/or the soot index with a behavior of machine 102. Controller 114 may transmit the record and/or the notification to management platform 104, control station 106, and/or network storage device 108, store the record and/or the notification in a data structure accessible to an operator (e.g., via memory 130 of machine 102, memory 138 of management platform 104, memory 144 of control station 106, and/or network storage device 108), and/or otherwise enable an operator to access the record and/or the notification (e.g., via user interface 132 of machine 102 and/or user interface 146 of control station 106).

In some implementations, controller 114 may generate a transmittance event if the transmittance does not satisfy the transmittance threshold, and/or generate a temperature event if the exhaust gas temperature does not satisfy the temperature threshold. The transmittance event may indicate information relating to the transmittance that triggered the transmittance event, the transmittance threshold used to trigger the transmittance event, a time corresponding to the transmittance event, an operating condition of machine 102 at the time of the event, a possible anomaly or cause of the transmittance event, a corrective action that was performed to correct the transmittance event, a corrective action that is suggested to correct the transmittance event, and/or other information informing an operator of the transmittance event. The temperature event may indicate information relating to the exhaust gas temperature that triggered the temperature event, the temperature threshold used to trigger the temperature event, a time corresponding to the temperature event, an operating condition of machine 102 at the time of the event, a corrective action that was performed to correct the temperature event, a corrective action that is suggested to correct the temperature event, and/or other information informing an operator of the temperature event.

In some implementations, controller 114 may generate a record and/or a notification of the transmittance event and/or the temperature event. For example, controller 114 may be configured to automatically perform a corrective action in response to the transmittance event and/or the temperature event, as described above. In such cases, the record and/or the notification may include information relating to the corrective action that was performed to correct the transmittance event and/or the temperature event. Additionally, or alternatively, controller 114 may be configured to receive confirmation from an operator prior to performing a corrective action. In such cases, the record and/or the notification may include a recommendation to an operator suggesting a corrective action to perform to correct the transmittance event and/or the temperature event, and prompt the operator for confirmation to perform the corrective action and/or another instruction. Based on input received from the operator via the record and/or the notification, controller 114 may perform the corrective action or enable the operator to manually perform the corrective action (e.g., manually operate machine 102 in a manner that increases the exhaust gas temperature to the activation temperature and/or clears soot that may have collected on first window 204 and/or second window 206).

As indicated above, FIGS. 3A and 3B are provided as an example. Other examples may differ from what is described in connection with FIGS. 3A and 3B.

Figure 4:
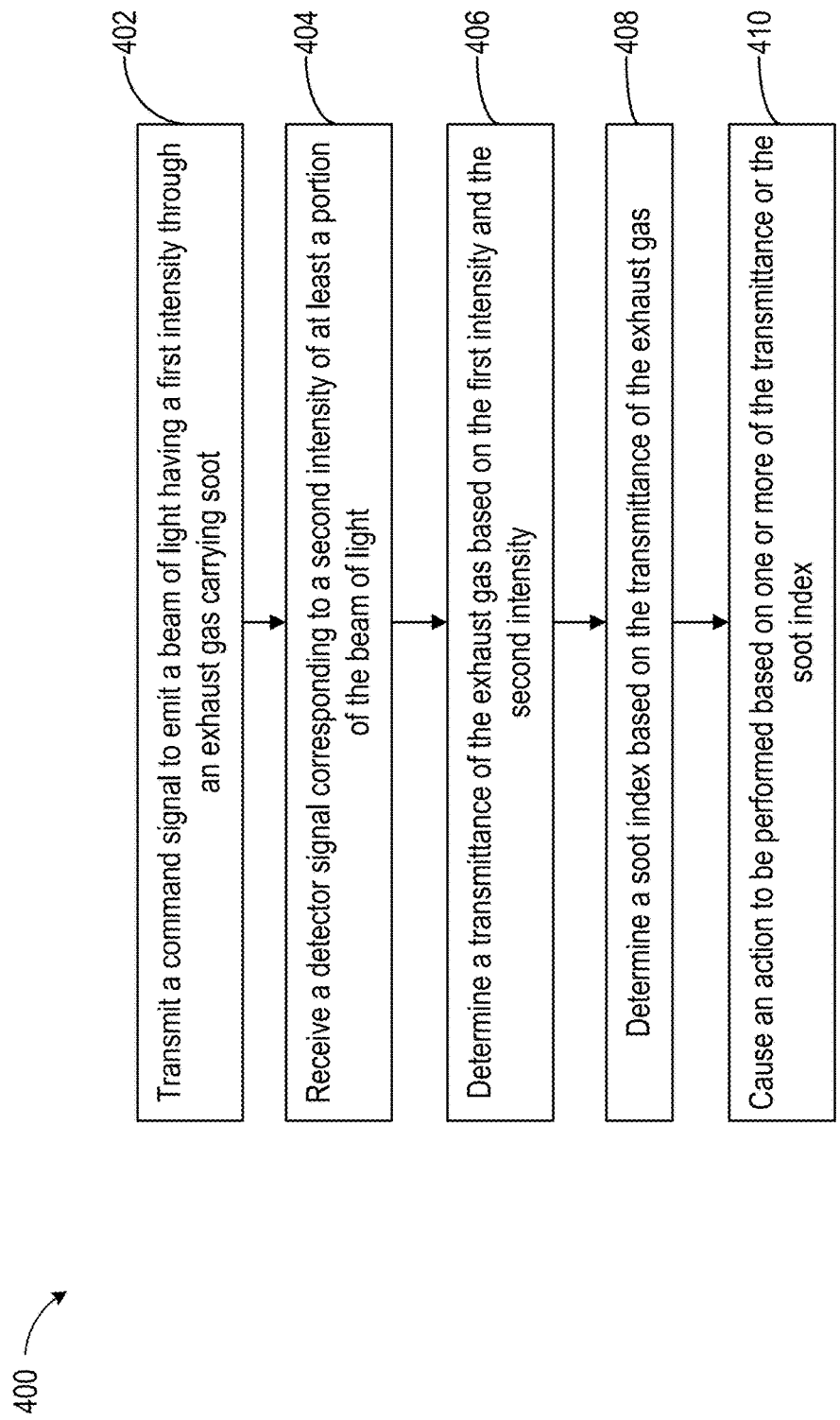
FIG. 4 is a flow chart of an example process for operating a soot measurement system.

FIG. 4 is a flow chart of an example process 400 for operating a soot measurement system. One or more process blocks of FIG. 4 may be performed by a controller (e.g., controller 114 of soot measurement system 100) and/or by another component or a group of components separate from or including the controller (e.g., management platform 104, control station 106, network storage device 108, and/or the like).

As shown in FIG. 4, process 400 may include transmitting a command signal to emit a beam of light having a first intensity through an exhaust gas carrying soot (block 402). For example, the controller (e.g., using processor 128, memory 130, user interface 132, communication device 134, and/or the like) may transmit a command signal to emit a beam of light having a first intensity through an exhaust gas carrying soot, as described above.

As further shown in FIG. 4, process 400 may include receiving a detector signal corresponding to a second intensity of at least a portion of the beam of light (block 404). For example, the controller (e.g., using processor 128, memory 130, user interface 132, communication device 134, and/or the like) may receive a detector signal corresponding to a second intensity of at least a portion of the beam of light, as described above.

As further shown in FIG. 4, process 400 may include determining a transmittance of the exhaust gas based on the first intensity and the second intensity (block 406). For example, the controller (e.g., using processor 128, memory 130, user interface 132, communication device 134, and/or the like) may determine a transmittance of the exhaust gas based on the first intensity and the second intensity, as described above.

As further shown in FIG. 4, process 400 may include determining a soot index based on the transmittance of the exhaust gas (block 408). For example, the controller (e.g., using processor 128, memory 130, user interface 132, communication device 134, and/or the like) may determine a soot index based on the transmittance of the exhaust gas, as described above.

As further shown in FIG. 4, process 400 may include causing an action to be performed based on one or more of the transmittance or the soot index (block 410). For example, the controller (e.g., using processor 128, memory 130, user interface 132, communication device 134, and/or the like) may cause an action to be performed based on one or more of the transmittance or the soot index, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

An engine (e.g., a diesel engine, a gasoline engine, a gaseous fuel-powered engine, a gas turbine engine, and/or another combustion engine) may combust a mixture of fuel and an intake charge (e.g., air that may include diluents such as re-circulated exhaust gases, gaseous fuels such as natural gas, and/or the like) to generate power for use with a machine (e.g., a vehicle, a work machine, a generator, and/or the like). During combustion, the engine may emit an exhaust gas which may carry air pollutants, such as soot (e.g., unburned hydrocarbons and/or other carbon-based particulates resulting from incomplete combustion), and/or the like. As environmental concerns continue to grow and as exhaust emission standards become more stringent, engine manufacturers continue to study combustion and emission behaviors of engines in search of ways to improve an efficiency of the engines, improve an effectiveness of aftertreatment systems, and/or otherwise further reduce air pollutants. In some cases, an engine manufacturer may examine an amount of soot in an exhaust gas in order to identify causal relationships between variations in soot levels and different operating conditions of an engine. The engine manufacturer may use such causal relationships to identify a deficiency associated with a combustion phase, a deficiency associated with an aftertreatment phase, and/or the like.

In some cases, a soot level of an exhaust gas can be measured based on transmittance of the exhaust gas using a beam of light that is emitted into a window of an exhaust pipe, through a streamline of the exhaust gas, and onto a photodiode placed at an opposing window of the exhaust pipe. The transmittance may correspond to a change in signal intensity between the light intensity that was emitted and the light intensity that was received by the photodiode, and indicative of an amount of light that was allowed to be transmitted through the exhaust gas. The transmittance may further be used to derive the soot level of the exhaust gas at a particular moment. Over time, however, thermophoresis between the windows and the exhaust gas can cause soot to collect on the windows, obstruct the laser, and adversely affect measurements. In such cases, an operator may need to disassemble the exhaust pipe to access the windows, manually clean soot off of the windows, and reassemble the exhaust pipe. This may be a tedious and time-consuming process even within a test environment where the exhaust pipe may be more readily accessible. Problems may be even more pronounced if the soot measurement device is integrated into a machine in production and intended for real-time monitoring.

A soot measurement system 100 described herein provides a solution for measuring soot in exhaust gas 126 reliably, accurately, and without drawbacks associated with currently available soot measurement solutions. The soot measurement system 100 provides a soot measurement device 124, 200 with windows 204, 206 and catalyzed layers 208, 210 that serve to reduce accumulation of soot on the windows 204, 206. In particular, the catalyzed layers 208, 210 are configured to activate at typical exhaust gas temperatures, and once activated, oxidizes and removes soot coming into contact with the catalyzed layers 208, 210 of the windows 204, 206. Furthermore, the soot measurement system 100 provides a controller 114 configured to monitor for conditions in which soot may nonetheless collect on the windows 204, 206 and obstruct a beam of light 220 of the soot measurement device 124, 200 (e.g., when an engine 110 is in a prolonged idle state and emitting soot at lower exhaust gas temperatures). In such cases, rather than providing an inaccurate measurement of the soot, the controller 114 may perform a corrective action (e.g., operate the engine 110 in a manner that temporarily increases exhaust gas temperatures) to clear the accumulation of soot on the windows 204, 206. The controller 114 may additionally generate events, records, and/or notifications that can be used to identify a causal relationship between variations in soot levels and different operating conditions of an engine 110.

Accordingly, the soot measurement system 100 overcomes one or more problems associated with currently available soot measurement solutions. For instance, the catalyzed layers 208, 210 on the windows 204, 206 of the soot measurement device 124, 200 reduces an opportunity for soot to accumulate on the windows 204, 206 and skew soot measurements. In addition, the controller 114 of the soot measurement system 100 is able to distinguish between optimal and suboptimal conditions prior to determining soot measurements to further ensure reliability of the soot measurements. The controller 114 also enables corrective actions that can be performed to autonomously or semi-autonomously correct suboptimal conditions, thereby overcoming a need for manual intervention by an operator and reducing associated downtime. The soot measurement device 124, 200 thereby provides a soot measurement solution that can be used in both test environments and real-time monitoring applications. In this way, the soot measurement system 100 enables better identification of potential causes of soot, which can lead to quicker solutions for reducing emissions and improving overall efficiency of combustion engines 110.

What is claimed is:

1. A device, comprising:
    a conduit configured to pass an exhaust gas therethrough, the conduit having a first side and a second side;
    a first window disposed on the first side of the conduit and a second window disposed on the second side of the conduit;
    a first catalyzed layer disposed on an inner surface of the first window and a second catalyzed layer disposed on an inner surface of the second window,
        the first catalyzed layer and the second catalyzed layer being configured to cause a reaction with soot in the exhaust gas at an activation temperature to reduce accumulation of the soot on the first window and the second window;
    an optical source disposed relative to the first window and configured to emit a beam of light into the conduit through the first window; and
    an optical detector disposed relative to the second window and configured to receive at least a portion of the beam of light through the second window.

2. The device of claim 1, wherein the first window and the second window comprise one or more of silica, quartz, or sapphire.

3. The device of claim 1, wherein the first catalyzed layer and the second catalyzed layer comprise cerium oxide,
    the first catalyzed layer and the second catalyzed layer having thicknesses ranging between approximately 1 nm and 2.5 nm.

4. The device of claim 1, wherein the first catalyzed layer and the second catalyzed layer comprise a catalyst configured to oxidize the soot at the activation temperature,
    the activation temperature being at least 400° C.

5. The device of claim 1, further comprising a controller in communication with the optical source and the optical detector, the controller being configured to:
    transmit, to the optical source, a command signal to emit the beam of light with a first intensity,
    receive, from the optical detector, a detector signal corresponding to a second intensity of the portion of the beam of light emitted by the optical source and received by the optical detector,
    determine a transmittance of the exhaust gas based on the first intensity and the second intensity, and
    determine a soot index based on the transmittance.

6. The device of claim 1, further comprising a controller in communication with the optical source and the optical detector, the controller being configured to:
    compare a temperature of the exhaust gas with a temperature threshold, and
    cause a corrective action to be performed based on determining that the temperature of the exhaust gas does not satisfy the temperature threshold,
        the corrective action increasing the temperature of the exhaust gas to the activation temperature for a threshold duration of time.

7. The device of claim 1, further comprising a controller in communication with the optical source and the optical detector, the controller being configured to:
    compare a transmittance of the exhaust gas with a transmittance threshold, and
    cause a corrective action to be performed based on determining that the transmittance of the exhaust gas does not satisfy the transmittance threshold,
        the corrective action increasing a temperature of the exhaust gas to the activation temperature for a threshold duration of time.

8. A system, comprising:
    a combustion engine configured to combust fuel and generate an exhaust gas;

a conduit coupled to the combustion engine and configured to pass the exhaust gas therethrough;

a first window disposed on a first side of the conduit and a second window disposed on a second side of the conduit;

a first catalyzed layer disposed on an inner surface of the first window and a second catalyzed layer disposed on an inner surface of the second window, the first catalyzed layer and the second catalyzed layer being configured to cause a reaction with soot in the exhaust gas at an activation temperature to reduce accumulation of the soot on the first window and the second window;

an optical source disposed relative to the first window and configured to emit a beam of light into the conduit through the first window;

an optical detector disposed relative to the second window and configured to receive at least a portion of the beam of light through the second window; and a controller in communication with the combustion engine, the optical source, and the optical detector, the controller being configured to:

determine a transmittance of the exhaust gas based on the beam of light emitted by the optical source and the portion of the beam of light received by the optical detector, and determine a soot index based on the transmittance.

9. The system of claim 8, wherein the first catalyzed layer and the second catalyzed layer comprise cerium oxide, the first catalyzed layer and the second catalyzed layer having thicknesses ranging between approximately 1 nm and 2.5 nm.

10. The system of claim 8, wherein the first catalyzed layer and the second catalyzed layer comprise a catalyst configured to oxidize the soot at the activation temperature, the activation temperature being at least 400° C.

11. The system of claim 8, wherein the controller is configured to, when determining the transmittance of the exhaust gas:

transmit, to the optical source, a command signal to emit the beam of light with a first intensity, receive, from the optical detector, a detector signal corresponding to a second intensity of the portion of the beam of light received by the optical detector, and determine the transmittance based on the first intensity and the second intensity.

12. The system of claim 8, wherein the controller is further configured to:

compare the transmittance with a transmittance threshold, and initiate a corrective action based on determining that the transmittance does not satisfy the transmittance threshold, the corrective action increasing a temperature of the exhaust gas to the activation temperature for a threshold duration of time.

13. The system of claim 8, wherein the controller is further configured to:

compare the transmittance with a transmittance threshold, and initiate a corrective action based on determining that the transmittance does not satisfy the transmittance threshold, the corrective action increasing a temperature of the exhaust gas to at least 400° C. for a threshold duration of time; and ceasing the corrective action based on determining that the transmittance satisfies the transmittance threshold.

14. The system of claim 8, wherein the controller is further configured to:

compare the transmittance with a transmittance threshold, and transmit, to the combustion engine, an engine control signal based on determining that the transmittance does not satisfy the transmittance threshold, the engine control signal being configured to increase an operating temperature of the combustion engine and increase a temperature of the exhaust gas to the activation temperature for a threshold duration of time.

15. A method, comprising:

transmitting, to an optical source, a command signal to emit a beam of light having a first intensity through an exhaust gas carrying soot;

receiving, from an optical detector, a detector signal corresponding to a second intensity of at least a portion of the beam of light emitted by the optical source and received by the optical detector;

determining a transmittance of the exhaust gas based on the first intensity and the second intensity;

comparing the transmittance with a transmittance threshold; and initiating a corrective action based on determining that the transmittance does not satisfy the transmittance threshold, the corrective action increasing a temperature of the exhaust gas to an activation temperature for a threshold duration of time.

16. The method of claim 15, wherein the corrective action includes increasing a temperature of the exhaust gas to at least 400° C. for the threshold duration of time; and ceasing the corrective action based on determining that the transmittance satisfies the transmittance threshold.

17. The method of claim 15, further comprising:

transmitting, to a combustion engine, an engine control signal based on determining that the transmittance does not satisfy the transmittance threshold, the engine control signal being configured to increase an operating temperature of the combustion engine and to increase the temperature of the exhaust gas to the activation temperature for the threshold duration of time.

18. The method of claim 15, further comprising:

comparing the transmittance with a transmittance threshold;

generating a transmittance event based on determining that the transmittance does not satisfy the transmittance threshold; and generating one or more of a record or a notification of the transmittance event.

19. The method of claim 15, further comprising:

determining a soot index based on the transmittance of the exhaust gas;

comparing the soot index with a soot index threshold;

generating a soot index event based on determining that the soot index satisfies the soot index threshold; and generating one or more of a record or a notification of the soot index event.

\* \* \* \* \*